No. 786,947. PATENTED APR. 11, 1905.
J. F. BIXLER.
DEFLECTOR FOR OVENS.
APPLICATION FILED DEC. 2, 1902.
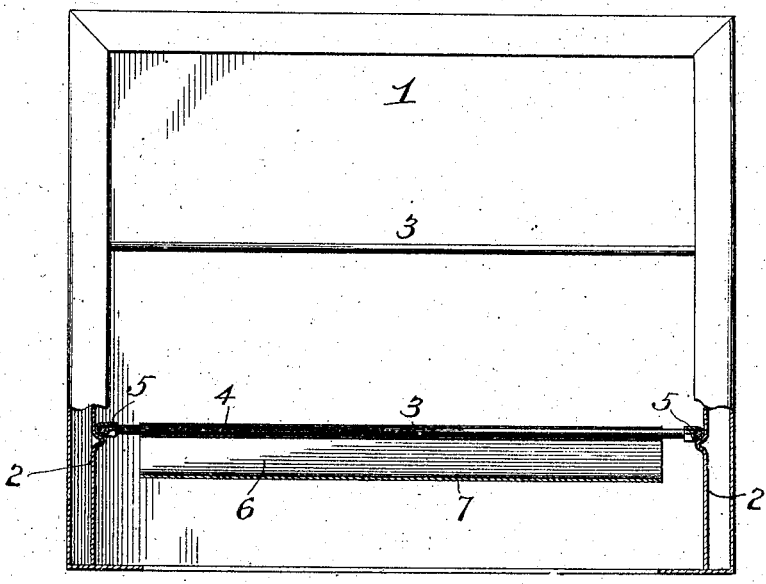
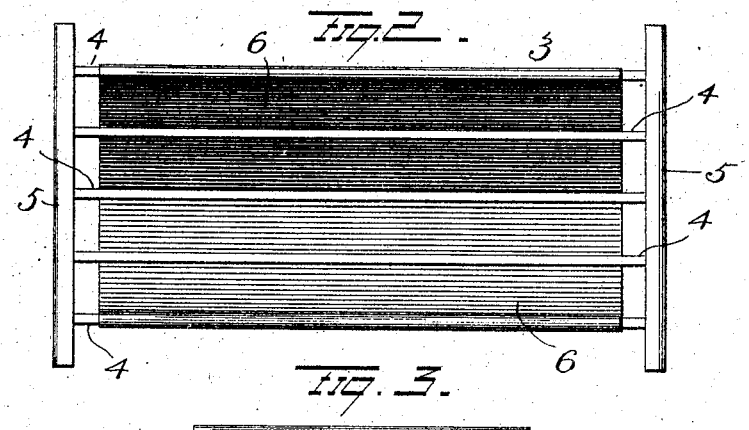
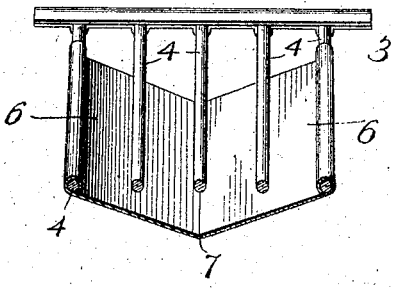
WITNESSES
E. S. Nottingham
G. F. Downing
INVENTOR
J. F. Bixler
By H. A. Seymour, Attorney No. 786,947. Patented April 11, 1905.

UNITED STATES PATENT OFFICE.

JOHN F. BIXLER, OF CINCINNATI, OHIO, ASSIGNOR TO ERNST H. HUENE-FELD, OF CINCINNATI, OHIO.

DEFLECTOR FOR OVENS.

SPECIFICATION forming part of Letters Patent No. 786,947, dated April 11, 1905.

Application filed December 2, 1902. Serial No. 133,582.

*To all whom it may concern:*

Be it known that I, JOHN F. BIXLER, of Cincinnati, in the county of Hamilton and State of Ohio, have invented certain new and useful Improvements in Deflectors for Ovens; and I do hereby declare the following to be a full, clear, and exact description of the invention, such as will enable others skilled in the art to which it appertains to make and use the same.

My invention relates to an improved deflector for ovens, and more particularly to a combined deflector and rack or tray, the object of the invention being to provide an improvement of this character which can be readily removed, cleaned, and replaced when desired.

With this object in view the invention consists in certain novel features of construction and combinations and arrangements of parts, as will be more fully hereinafter described, and pointed out in the claims.

In the accompanying drawings, Figure 1 is a view illustrating my improvements in an oven. Fig. 2 is a view of the same removed, and Fig. 3 is a view in section thereof.

1 represents an oven-body having the ordinary lining 2 made with ridges or supports for the oven racks or trays 3.

The rack or tray 3 comprises a series of parallel rods or wires 4, connected at their ends by strip 5, and my improved deflector 6 is secured thereto, as will now be explained. The deflector 6 comprises a sheet of metal trough bent longitudinally at its center at an angle, as shown at 7, to incline the deflector upward at each side, and the longitudinal edges of the deflector are bent to encircle the side rods or wires 4 to secure the deflector thereto.

By constructing my improvements as above explained they have the double function of a rack or tray and a deflector and can be easily removed and replaced when desired.

A great many changes might be made in the general form and arrangement of the parts described without departing from my invention, and hence I do not confine myself to the precise details set forth, but consider myself at liberty to make such slight changes and alterations as fairly fall within the spirit and scope of my invention.

Having fully described my invention, what I claim as new, and desire to secure by Letters Patent, is—

1. An oven having an open bottom, the side walls of said oven bent inwardly near the open bottom and forming beads projecting inwardly from said side walls, strips resting upon said beads, a series of parallel rods connecting said strips, and a deflector-plate bent longitudinally at its center and having its free edges attached to two of said parallel rods, said deflector forming a concave trough under said series of parallel rods.

2. The combination with an oven having an open bottom, of a removable structure therein comprising a series of parallel rods, strips connecting said rods at their respective ends and supported by opposite walls of the oven, and a trough disposed under said rods and having its longitudinal edges permanently secured to two of them, said trough to be disposed over the open bottom of the oven and constitute a deflector.

In testimony whereof I have signed this specification in the presence of two subscribing witnesses.

JOHN F. BIXLER.

Witnesses:
GEO. W. CARMANY,
CHARLES E. PFAU.